3,562,201
UNSATURATED POLYESTER RESIN/MONOMER
MOULDING COMPOSITIONS
Alan Crowe and David Philip Fry, Cardiff, Glamorgan,
Wales, assignors to British Resin Products Limited,
London, England
No Drawing. Filed Mar. 12, 1969, Ser. No. 806,741
Claims priority, application Great Britain, Mar. 19, 1968,
13,163/68
Int. Cl. C08g 51/04
U.S. Cl. 260—40                                    6 Claims

ABSTRACT OF THE DISCLOSURE

A process for the preparation of moulded articles by means of extrusion or injection moulding a free flowing unsaturated polyester resin/monomer composition, wherein the composition comprises an unsaturated polyester, a copolymerisable monomer and a primary absorbent filler which releases the absorbed unsaturated polyester resin/monomer system under pressure and/or shear during the injection or extrusion moulding process.

---

The present invention is concerned with improvements in and relating to unsaturated polyester moulding compositions.

Thermosetting moulding powders are known and comprise a mixture of a finely divided resin binder, e.g., a phenolic resin, fillers, pigments and catalysts. The free-flowing nature of these powders makes them particularly suitable for injection and extrusion moulding operations.

An object of the present invention is to provide an unsaturated polyester moulding composition in a solid, free-flowing form which is suitable for use in injection and extrusion moulding operations.

Accordingly the present invention is a process for the production of an injection or extrusion moulded article from an unsaturated polyester resin composition which comprises forming a solid, free-flowing moulding composition comprising a liquid unsaturated polyester/monomer system and a primary absorbent filler for the liquid system which releases absorbed liquid under pressure or shear during moulding and injection or extrusion moulding the composition.

A free-flowing unsaturated polyester moulding composition for use in the process of the present invention, comprises a solid, free-flowing mixture of a liquid unsaturated polyester resin/monomer system and a primary absorbent filler for the liquid system which releases absorbed liquid under pressure or shear during moulding operations.

The solid mixture is free flowing in the sense that it is particulate in nature. Most suitably it has a particle size which enables it to be used in conventional injection and extrusion moulding equipment. For example the particle size can vary from about 1 micron to a quarter of an inch in diameter with a mean particle diameter of about one-sixteenth of an inch.

Liquid unsaturated polyester resin-monomer systems are commonly used as a basis to the resin binder for moulding compositions and this type of system is suitable for use in the solid free-flowing moulding compositions of the present invention.

The proportions and type of polyester and monomer must be such as to give a liquid system.

Typically the polyester component of these systems can be prepared by poly-condensation of a polycarboxylic acid (or anhydride) with a polyhydric alcohol, one of the components having nonaromatic unsaturation capable of undergoing addition polymerisation, e.g., ethylenic unsaturation. The dicarboxylic acids and dihydric alcohols are mainly used especially the $\alpha$-unsaturated $\alpha,\beta$-dicarboxylic acids. The unsaturated acids may be partly replaced by a saturated polycarboxylic acid, e.g., phthalic or isophthalic acids. It is preferred to use a mixture of saturated and unsaturated dicarboxylic acids together with a glycol. Suitable unsaturated acids are for example, maleic, fumaric, or their anhydrides. Suitable dihydric alcohols are for example, ethylene glycol, diethylene glycol, propylene glycol, hexylene glycol and the condensation products of ethylene or propylene oxide with bisphenol A. Part of the dihydric alcohol may be replaced by polyhydric alcohols such as pentaerythritol or by monohydric alcohols such as cyclohexanol. Alternatively, the polyesters can be prepared by reacting olefin oxides, such as ethylene or propylene oxide with the foregoing acids or anhydrides.

The monomer is typically an unsaturated monomer copolymerisable with the polyester. Such monomers are known from the literature and include monomeric vinyl and substituted vinyl compounds such as vinyl esters, the esters of acrylic, methacrylic, maleic or fumaric acids, allyl and polyallyl compounds and vinyl aromatic compounds. Some examples are styrene, vinyl toluene, and diallyl phthalate. The monomers can comprise between 25 and 75 percent by weight of the polyester in the system. The preferred system contains styrene as the monomer and in this system typical proportions of monomer in relation to the total weight of the polyester are in the range 30 to 50 percent by weight and preferably in the range 35 to 45 percent by weight.

Most suitably the proportion of liquid polyester/monomer system in relation to the total weight of the composition is in the range 10 to 40 percent by weight and preferably in the range 20 to 30 percent by weight.

The polyester/monomer systems typically contain a polymerisation initiator which is usually a free radical forming compound. Some examples are: benzoyl peroxide and tert. butyl perbenzoate.

The polymerisation initiators should be present in an effective amount to initiate polymerisation. This type of initiator and the amounts in which it can be used are known. Typical quantities are in the range 0.1 to 8 percent by weight in relation to the total weight of unsaturated polyester resin and monomer copolymerisable therewith.

The primary absorbent filler has the property of being able to absorb liquid from the polyester/monomer system to induce the solid, free-flowing characteristics of the mixture and then release this liquid under pressure or shear during the moulding operation.

Typically the primary filler can be inorganic in nature. For example a diatomite such as diatomaceous earth, kieselguhr, siliceous earth, tripolite and infusorial earth, or other absorbent inorganic substances such as bentonite and absorbent silica. The preferred filler is "Dicalite" which is a registered trademark for a large group of materials processed from diatomite. In the case of the diatomite type of filler such as "Dicalite" the absorbed liquid is released by pressure which crushes the siliceous shells which make up the material. In injection moulding operations the pressure in the equipment is usually sufficient to release the absorbed liquid before the composition is injected into the mould. In extrusion moulding the pressure generated by the action of the extruder screw is sufficient to release absorbed liquid before the composition reaches the extruder die. Heat alone cannot be used. Pressure or shear is the essential factor with which heat may or may not be used. Typical shear rates and pressures that may be used are $10^2$–$10^4$ sec.$^{-1}$ and 50–1250 p.s.i., respectively.

The primary absorbent filler must be present in an effective amount to absorb sufficient liquid from the liquid polyester/monomer system to give a solid free flowing mixture. This quantity will depend on such factors as the exact nature of the filler and liquid system, and the presence of a secondary filler or fillers. For example where the composition substantially consists of the liquid polyester/monomer system and "Dicalite" as the filler the minimum amount of filler would be about 20 percent by weight in relation to the total weight of the polyester/monomer system and the maximum 150 percent by weight.

A secondary filler can and preferably should be present. Any of the fillers used in known resin bound moulding compositions are suitable. Typically the filler may be glass fibre, minerals, e.g., finely divided minerals such as calcium carbonate, clay, alumina trihydrate, gypsum, (calcium sulphate dihydrate) dolomite and abestos or synthetic fibres such as acrylic, rayon, polyester or nylon fibres, or cellulosic including sisal or more usually a mixture of fillers.

The secondary filler can comprise up to 85 percent by weight in relation to the total weight of the composition. A particularly useful type of filler consists of a mixture of glass fibres and a finely divided mineral.

Part of the secondary filler can be replaced by a modifier to control shrinkage on moulding. Such modifiers are known and typically comprise thermoplastic materials, e.g., polystyrene, polyethylene, and polymeric plasticisers, the preferred system being a combination of a thermoplastic and a polymeric plasticiser. Most suitably the modifier can be present in an amount between 2 to 20 percent by weight of the total composition.

A particularly useful formulation of a free flowing moulding composition containing a secondary filler would have the following specifications.

| Component: | Percentage by weight in relation to total weight of the composition |
|---|---|
| Liquid unsaturated polyester resin/monomer system (63% by wt. solution of polyester in monomer) | 10–40 |
| Catalyst | 0.1–2.0 |
| Lubricants | 0.1–5.0 |
| Modifier to control shrinkage on moulding | 0–20 |
| Secondary filler: | |
| (A) Mineral | 0–85 |
| (B) Fibre reinforcement | 0–35 |
| Primary absorbent filler "Dicalite" | 1–85 |

The following examples illustrate unsaturated polyester free flowing moulding compositions of the invention.

EXAMPLE 1

The following ingredients with the exception of the "Dicalite" were mixed in a Z-blade mixer until a homogeneous product was obtained.

| Ingredients: | Parts by weight |
|---|---|
| Resin | 20.0 |
| Benzoyl peroxide paste (65%) | 1.0 |
| Zinc stearate | 1.45 |
| Stearine | 0.2 |
| Hydroquinone | 0.05 |
| Hexaplas PPA | 4.0 |
| Finely divided polystyrene | 1.5 |
| Precipitated calcium carbonate | 41.8 |
| Corn flusk | 15.0 |
| "Dicalite" | 15.0 |
| Total | 100.0 |

The "Dicalite" was then added evenly, as mixing proceeded. When the addition was complete the mixing was continued until a solid free flowing mixture was obtained. This mixture had the following particle size distribution.

| B.S. Sieve Mesh No.: | Percent w./w. held |
|---|---|
| 5 | 10 |
| 10 | 18 |
| 18 | 17 |
| 44 | 33 |
| 100 | 20 |
| Fines | 2 |

Moulded articles are readily prepared from the composition by screw injection, extrusion or transfer moulding techniques.

EXAMPLE 2

A moulding composition having the following ingredients was made up using the mixing procedure described in Example 1.

| Ingredients: | Parts by weight |
|---|---|
| Resin | 30.0 |
| Benzoyl peroxide paste (65%) | 1.0 |
| Zinc stearate | 1.45 |
| Stearine | 0.2 |
| Hydroquinone | 0.05 |
| Reoplex PPS | 4.0 |
| Polyvinyl chloride (Breon 121) | 1.5 |
| Calcium carbonate | 31.8 |
| Corn flusk | 15.0 |
| "Dicalite" | 15.0 |
| Total | 100.0 |

The composition was a solid free flowing mixture having the following particle size distribution.

| B.S. Sieve Mesh No.: | Percent w./w. held |
|---|---|
| 5 | 13 |
| 10 | 35 |
| 18 | 16 |
| 44 | 25 |
| 100 | 10 |
| Fines | 1 |

Moulded articles were readily prepared from the composition by the compression, screw injection, extrusion and transfer moulding techniques.

EXAMPLE 3

A moulding composition having the following ingredients was made up using the mixing procedure described in Example 1.

| Ingredients: | Parts by weight |
|---|---|
| Resin | 20.0 |
| Benzoyl peroxide paste (65%) | 1.0 |
| Zinc stearate | 1.45 |
| Stearine | 0.2 |
| Hydroquinone | 0.05 |
| Hexaplas PPA | 4.0 |
| Finely divided polystyrene | 1.5 |
| Precipitated calcium carbonate | 36.8 |
| Milled glass fibres | 10.0 |
| "Dicalite" | 25.0 |
| Total | 100.0 |

The composition was a solid free flowing mixture which was used to prepare moulded articles by the screw injection or extrusion moulding techniques.

What is claimed is:

1. A process for the production of an injection or extrusion moulded article from an unsaturated polyester resin composition which comprises forming a solid, free flowing, moulding composition comprising 10 to 40 weight percent of the total composition of a liquid unsaturated polyester/monomer system, said system containing an amount of copolymerizable monomer equal to from 25 to 75 weight percent of the liquid unsaturated polyester and 20 to 150 weight percent, based on the weight of the liquid unsaturated polyester/copolymerizable monomer system of a primary absorbent filler for the liquid system which releases the absorbed liquid system under pressure or shear during moulding, and injection or extrusion moulding the composition.

2. A process according to claim 1 wherein the moulding composition has a particle size within the range 1 micron to one quarter of an inch in diameter.

3. A process according to claim 1 wherein the monomer is styrene, and the styrene is present in an amount by weight in the range 30 to 50 percent of the unsaturated polyester in the system.

4. A process according to claim 1 wherein the primary absorbent filler is a diatomite, bentonite or an absorbent silica.

5. A process according to claim 1 wherein the moulding composition is subjected to a shear rate in the range $10^2$–$10^4$ sec.$^{-1}$ and/or a pressure in the range 50–1250 p.s.i. in the course of the moulding operation.

6. A free flowing unsaturated polyester moulding composition for use in the process as claimed in claim 1 comprising 10 to 40 weight percent of the total composition of a solid, free flowing mixture of a liquid unsaturated polyester resin/monomer system, said system containing an amount of copolymerizable monomer equal to from 25 to 75 weight percent of the liquid unsaturated polyester and 20 to 150 weight percent based on the weight of the liquid unsaturated polyester/copolymerizable monomer system of a primary absorbent filler for the liquid system, which releases the absorbed liquid system under pressure or shear during moulding conditions.

References Cited

UNITED STATES PATENTS

| | | | |
|---|---|---|---|
| 2,887,461 | 5/1959 | Hort | 260—40 |
| 3,131,148 | 4/1964 | Taulli | 260—40X |
| 3,462,514 | 8/1969 | Kurkowski et al. | 260—40X |

ALLAN LIEBERMAN, Primary Examiner

L. T. JACOBS, Assistant Examiner